United States Patent
Goel et al.

(10) Patent No.: US 9,596,215 B1
(45) Date of Patent: Mar. 14, 2017

(54) PARTITIONING A FILTER TO FACILITATE FILTRATION OF PACKETS

(71) Applicant: Juniper Networks, Inc., Sunnyvale, CA (US)

(72) Inventors: Deepak Goel, San Jose, CA (US); Patrick Kerharo, Sunnyvale, CA (US); Jigar K. Savla, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/696,702

(22) Filed: Apr. 27, 2015

(51) Int. Cl.
*H04L 29/00* (2006.01)
*H04L 29/06* (2006.01)
*G06F 17/30* (2006.01)
*H04L 12/741* (2013.01)

(52) U.S. Cl.
CPC .... *H04L 63/0263* (2013.01); *G06F 17/30501* (2013.01); *H04L 63/0236* (2013.01); *H04L 45/74* (2013.01)

(58) Field of Classification Search
CPC .... H04L 63/0227; H04L 45/742; H04L 45/74
USPC ........................................................ 726/13
See application file for complete search history.

(56) References Cited

U.S. PATENT DOCUMENTS

| | | | |
|---|---|---|---|
| 8,027,330 B2* | 9/2011 | Paddon | H04L 63/0227 370/351 |
| 8,800,021 B1 | 8/2014 | Swaminathan et al. | |
| 2003/0074458 A1* | 4/2003 | Gokhale | H04L 45/742 709/230 |
| 2007/0039044 A1* | 2/2007 | Moonen | H04L 63/0227 726/13 |
| 2010/0272120 A1* | 10/2010 | Liang | H04N 21/434 370/465 |
| 2014/0241362 A1* | 8/2014 | Bosshart | H04L 45/74 370/392 |

* cited by examiner

*Primary Examiner* — Hadi Armouche
*Assistant Examiner* — Bryan Wright
(74) *Attorney, Agent, or Firm* — Harrity & Harrity, LLP

(57) ABSTRACT

A method may include obtaining a match vector that indicates one or more filter rules that are potentially applicable to a packet. The method may include partitioning the match vector into a plurality of segments. The method may include generating a summary vector that identifies one or more portions of the match vector that include one or more match bits. A match bit may indicate one of the one or more filter rules that is potentially applicable to the packet. The method may include obtaining a relevant segment of the match vector. The relevant segment may include at least one of the portions of the match vector identified by the summary vector. The method may include determining a filter rule to apply based on the match vector and based on the one or more match bits. The method may include applying the filter rule to the packet.

20 Claims, 13 Drawing Sheets

PARTITIONING A FILTER TO FACILITATE FILTRATION OF PACKETS

BACKGROUND

Packets being received and/or provided via a network may be filtered by a firewall (e.g., a firewall device, a firewall software, a packet processing engine, etc.). The firewall may filter the packets based on filter rules that associate packet information (e.g., a source of the packets, a destination of the packets, protocols associated with the packets, etc.) with actions to perform on the packets.

SUMMARY

According to some possible implementations, a method may include obtaining a match vector that indicates one or more filter rules that are potentially applicable to a packet that is received by a device. The one or more filter rules may be included in a filter that includes a plurality of filter rules. The method may include partitioning the match vector into a plurality of segments. The method may include generating a summary vector that identifies one or more portions of the match vector that include one or more match bits. A match bit, of the one or more match bits, may indicate one of the one or more filter rules that is potentially applicable to the packet. The method may include obtaining a relevant segment of the match vector. The relevant segment may include at least one of the one or more portions of the match vector identified by the summary vector. The method may include determining a particular filter rule, of the one or more filter rules, to apply based on the one or more portions of the match vector and based on the one or more match bits. The method may include applying the particular filter rule to the packet.

According to some possible implementations, a device may include one or more processors. The one or more processors may generate a filter based on a filter specification. The filter specification may identify a plurality of filter rules. The plurality of filter rules may be included in the filter. The one or more processors may identify one or more filter rules of the plurality of filter rules that are potentially applicable to a packet. The one or more processors may generate a match vector that identifies the one or more filter rules that are potentially applicable to the packet. The match vector may identify the one or more filter rules using one or more match bits. A match bit, of the one or more match bits, may indicate one of the one or more filter rules that is potentially applicable to the packet. The one or more processors may partition the match vector into segments. The one or more processors may generate a summary vector that identifies one or more portions of the match vector that include at least one match bit. The one or more portions of the match vector may be included in one or more of the segments. The one or more processors may obtain, based on the summary vector, a relevant segment of the one or more segments. The relevant segment may be a segment that includes one or more of the portions. The one or more processors may identify a match bit in the relevant segment that corresponds to a particular filter rule of the one or more filter rules. The match bit may indicate that the particular filter rule is applicable to the packet. The one or more processors may apply the particular filter rule to the packet.

According to some possible implementations, a computer-readable medium may store one or more instructions that, when executed by one or more processors, cause the one or more processors to obtain a filter that includes a plurality of filter rules that are possibly applicable to packets. The one or more instructions may cause the one or more processors to identify one or more filter rules of the plurality of filter rules that are possibly applicable to the packets based on packet information associated with the packets. The one or more instructions may cause the one or more processors to generate a plurality of match vectors that identify the one or more filter rules. Each of the plurality of match vectors may identify one or more of the one or more filter rules that are applicable to at least some of the packet information. The one or more instructions may cause the one or more processors to partition the plurality of match vectors into segments. The one or more instructions may cause the one or more processors to generate a plurality of summary vectors, corresponding to the plurality of match vectors, that identify portions, of the plurality of match vectors, that include one or more match bits. A match bit, of the one or more match bits, may indicate one of the one or more filter rules that are possibly applicable to the packets. The one or more instructions may cause the one or more processors to obtain a relevant segment, of the segments, based on the plurality of summary vectors including a similarly positioned match bit that identifies one or more portions included in the relevant segment. The one or more instructions may cause the one or more processors to determine a filter rule, of the one or more filter rules, to apply to the packet based on the relevant segment and based on the particular packet information. The one or more instructions may cause the one or more processors to apply the filter rule to the packet.

DETAILED DESCRIPTION

The following detailed description of example implementations refers to the accompanying drawings. The same reference numbers in different drawings may identify the same or similar elements.

A firewall (e.g., a firewall device, a firewall software application, a packet processing component, etc.) may filter network traffic (e.g., packets) based on a set of filter rules, referred to herein as a filter. A filter rule of the filter may specify packet information (e.g., a source Internet Protocol (IP) address of a packet, a destination IP address of the packet, a protocol associated with the packet, a source network port of the packet, a destination network port of the packet, etc.), and may indicate one or more actions to perform on packets that match the packet information. If a packet matches the packet information, the firewall may perform the one or more actions and/or cause the one or more actions to be performed on the packet.

The firewall may be unable to implement filters larger than a certain size and/or filters that contain a certain quantity of filter rules. For example, hardware of a firewall may limit a quantity of filter rules that the firewall may enforce based on restrictions imposed by size of components, heat generation, and/or performance limitations. As another example, software of a firewall may suffer increased latency as the firewall software enforces an increasing quantity of rules. The firewall may also be incapable of reading, storing, compressing, and/or decompressing vectors of a particular size, which may further limit the size of filter that the firewall may enforce. Implementations described herein may enable a firewall to partition a large filter into segments that the firewall is capable of efficiently processing, which may improve latency of the firewall and enable the firewall to enforce filters that include an increased quantity of rules. Further, implementations described herein may reduce an amount of storage space used to enforce a filter of arbitrary size.

Figure 1A:
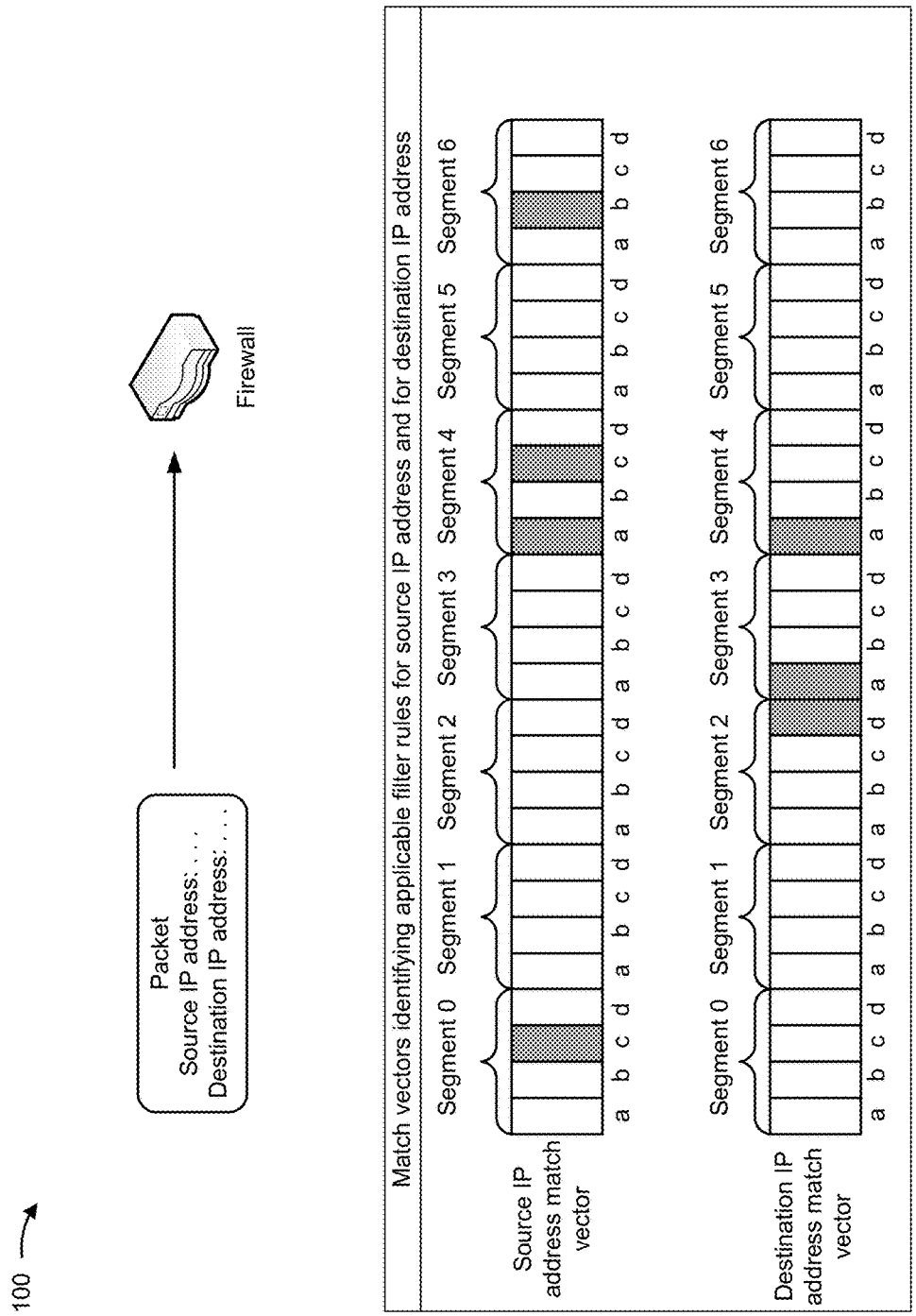
FIG. 1A-1C are diagrams of an overview of an example implementation described herein.
Figure 1B:
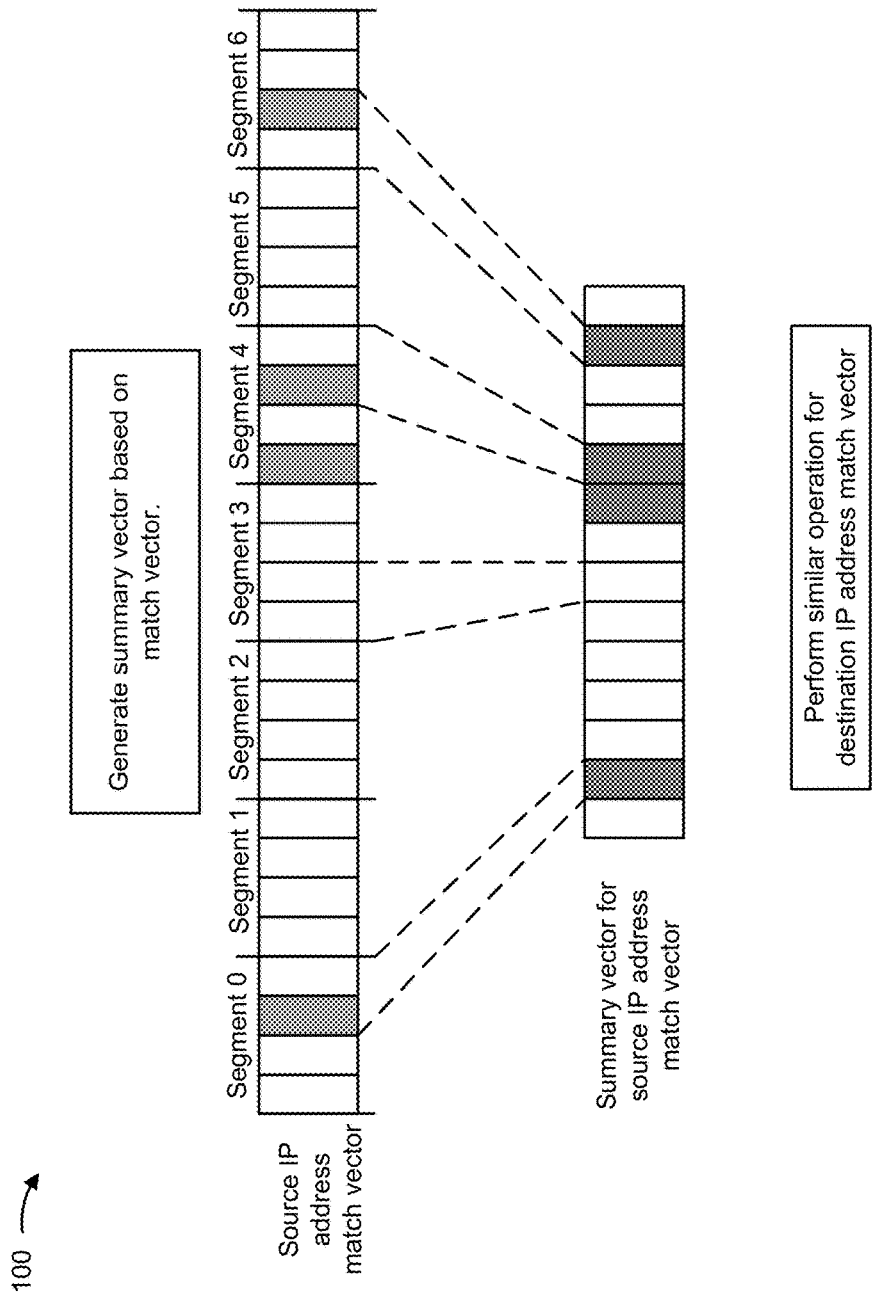
Figure 1C:
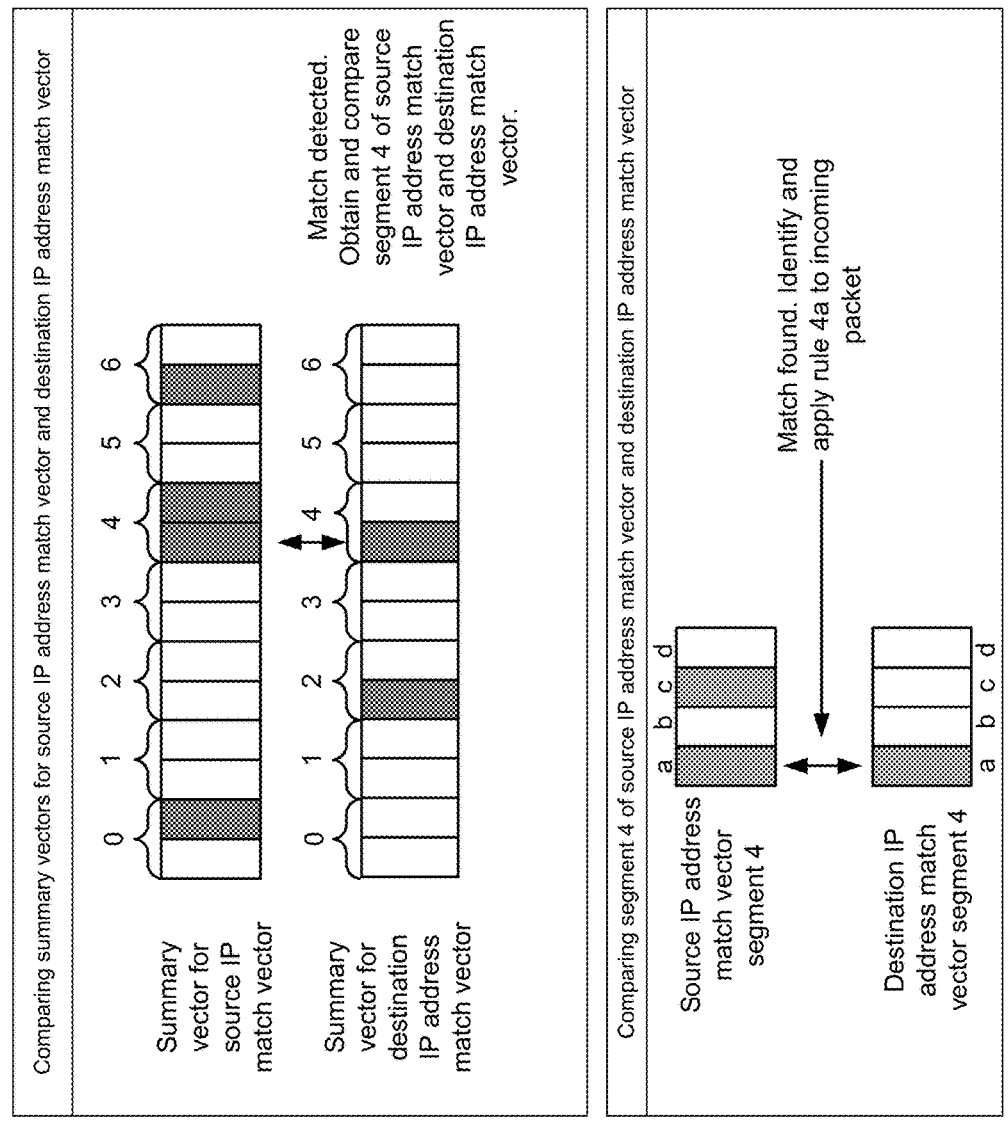
Figure 1C:
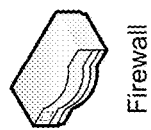

FIGS. 1A-1C are diagrams of an overview of an example implementation 100 described herein. For the purposes of FIGS. 1A-1C, assume that a shaded bit indicates a match bit, and assume that a non-shaded bit indicates a non-match bit, as described in more detail below.

As shown in FIG. 1A, a firewall may receive an incoming packet. Assume that the incoming packet is associated with a source IP address and a destination IP address. As shown, assume that the firewall performs a search of a filter, based on the source IP address and the destination IP address, to identify filter rules that are possibly or are potentially applicable to the packet. Assume that the filter rules indicate an action to perform on packets associated with the source IP address and/or the destination IP address. Assume that the firewall identifies a first set of filter rules based on the source IP address, and assume that the firewall identifies a second set of filter rules based on the destination IP address. Assume that a filter rule must match the source IP address and the destination IP address to be applicable to the packet.

As shown, assume that the firewall generates a first match vector to describe the first set of applicable filter rules. The first match vector may identify applicable filter rules by assigning a "match" value to bits, of the match vector, that are associated with the first set of applicable filter rules. As further shown, assume that the firewall generates a second match vector to describe the second set of applicable filter rules. The second match vector may identify applicable filter rules by assigning a "match" value to bits, of the match vector, that are associated with the second set of applicable filter rules. A bit that is associated with a "match" value may be referred to herein as a "match bit." As shown by the source IP address match vector and the destination IP address match vector, assume that a filter rule associated with bit "a" of segment 4 is applicable to packets associated with the source IP address and the destination IP address.

As shown by FIG. 1B, the firewall may generate a summary vector based on the source IP address match vector. Assume that the summary vector includes bits that correspond to portions of the source IP address match vector. For example, as shown, a second bit of the summary vector may correspond to a third bit and a fourth bit in the source IP address match vector, and the first bit may be a match bit based on at least one of the third bit or the fourth bit of the match vector being a match bit. As shown, assume that the firewall stores the summary vector and location information identifying locations of segments of the match vector that include at least one match bit (e.g., segment 0, segment 4, and segment 6).

As shown, assume that the firewall performs similar operations on the destination IP address match vector to generate a destination IP address summary vector, and assume that the firewall stores the destination IP address summary vector and location information identifying locations of segments of the destination IP address match vector that include at least one match bit.

As shown in FIG. 1C, the firewall may compare the source IP address summary vector and the destination IP address summary vector to determine a segment, of the source IP address match vector and the destination IP address match vector, that includes a match bit. As shown, segment 4 of the source IP address match vector and the destination IP address match vector include a match bit. As further shown, the firewall may obtain segment 4 of the source IP address match vector and the destination IP address match vector for comparison (e.g., based on the location information).

As shown, the firewall may determine that bit "a" is a match bit in segment 4 of the source IP address match vector and the destination IP address match vector. As further shown, the firewall may determine a filter rule based on bit "a" of segment 4. For example, the firewall may refer to a locally stored copy of the filter to determine the rule. As shown, the firewall may perform an action based on the rule.

Implementations described herein may enable a firewall to partition a match vector that describes a filter into segments, and to generate a summary vector that identifies segments that contain match bits. Based on summary vectors of two or more match vectors, the firewall may determine segments of the two or more match vectors to compare, in order to determine applicable filter rules identified by the two or more match vectors. In this way, the firewall may reduce an amount of storage space used to store the match vector, may enable the firewall to enforce arbitrarily large filters, may improve filtering speed, and may reduce latency of the firewall when filtering the packets.

Figure 2:
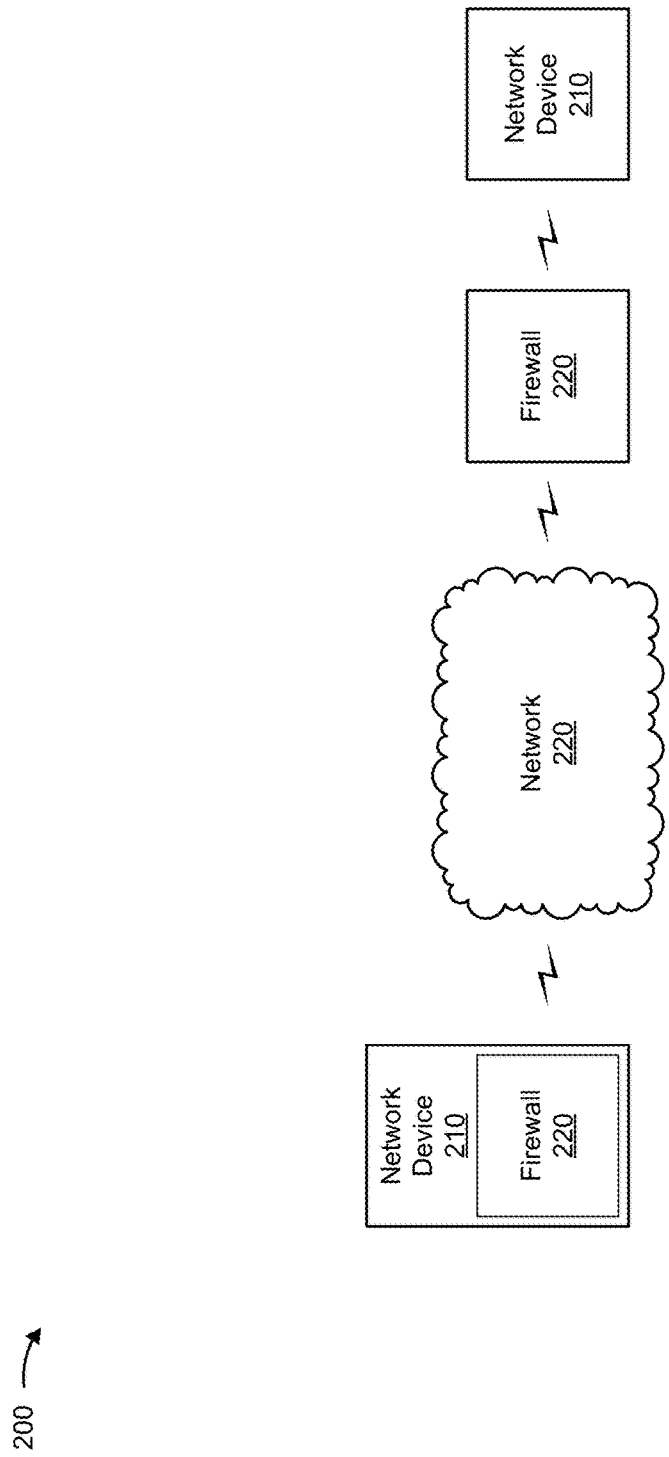
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210, which may include a firewall 220. Furthermore, environment 200 may include a firewall 220 (e.g., a hardware firewall device), and a network 230. Devices of environment 200 may interconnect via wired connections, wireless connections, or a combination of wired and wireless connections.

Network device 210 may include a device capable of receiving, transmitting, processing, and/or routing packets travelling via network 230. For example, network device 210 may include a router, a switch, a gateway, a modem, a network interface controller (NIC), a hub, a bridge, an optical add-drop multiplexer (OADM), or another type of network device. In some implementations, network device 210 may include one or more input ports associated with receiving packets and one or more output ports associated with transmitting packets. In some implementations, network device 210 may be connected to one or more other network devices 210. In some implementations, network device 210 may communicate with other devices (not shown) in order to process and/or route packets received by network device 210. In some implementations, network device 210 may host firewall 220. For example, network device 210 may include firewall software, firewall hardware, or the like, that performs functions of firewall 220.

Firewall 220 may include a device capable of receiving, transmitting, processing, and/or routing packets travelling via network 230. In some implementations, firewall 220 includes hardware, firmware, and/or a combination of software and hardware to implement the functions of firewall 220. Firewall 220 may filter packets based on filter rules applicable to the packets.

Network 230 may include one or more wired and/or wireless networks that include network devices 210 and/or firewalls 220 and/or allow network devices 210 and/or firewalls 220 to communicate. For example, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
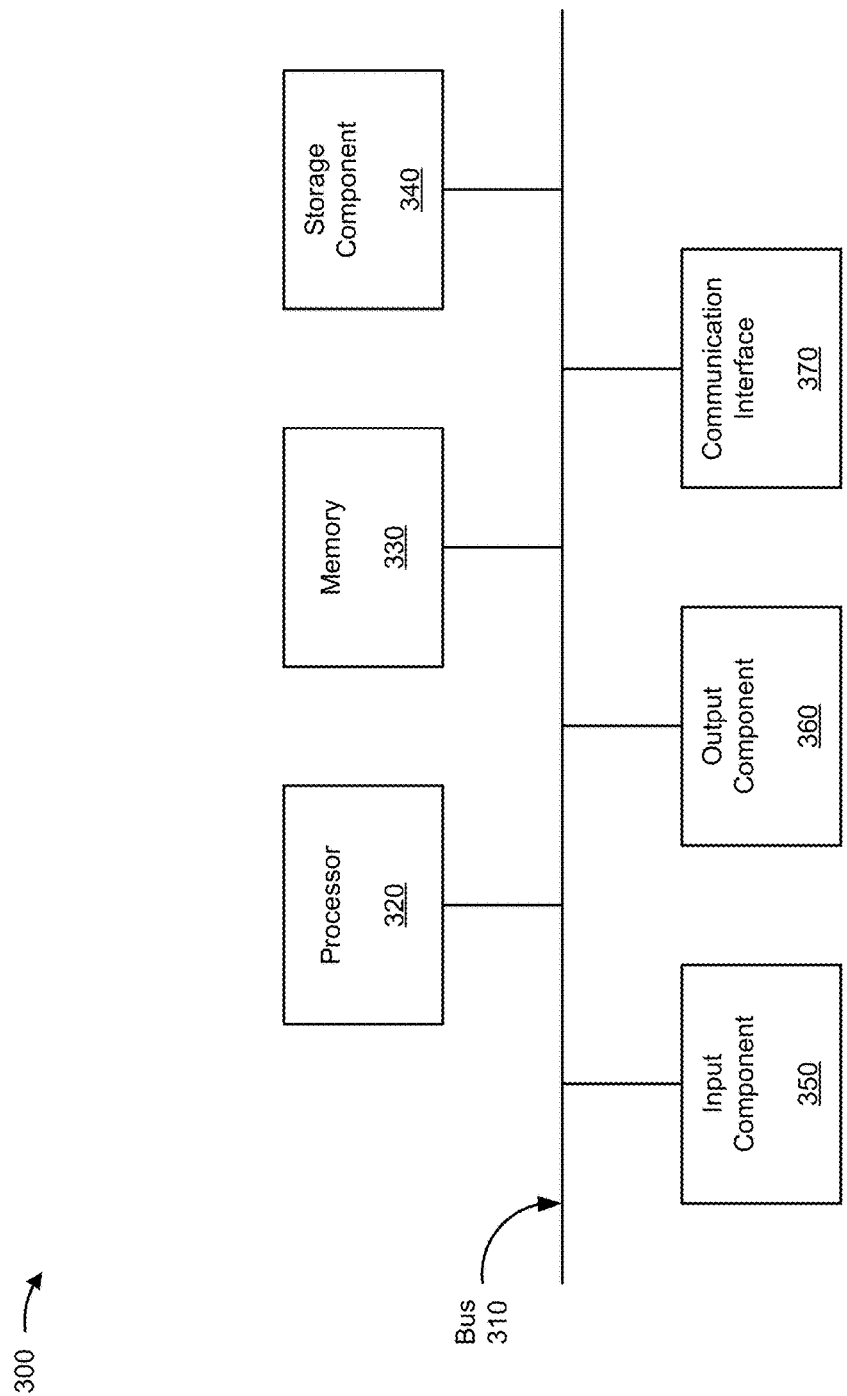
FIG. 3 is a diagram of example components of one or more devices of FIG. 2.

FIG. 3 is a diagram of example components of a device 300. Device 300 may correspond to network device 210 and/or firewall 220. In some implementations, network device 210 and/or firewall 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
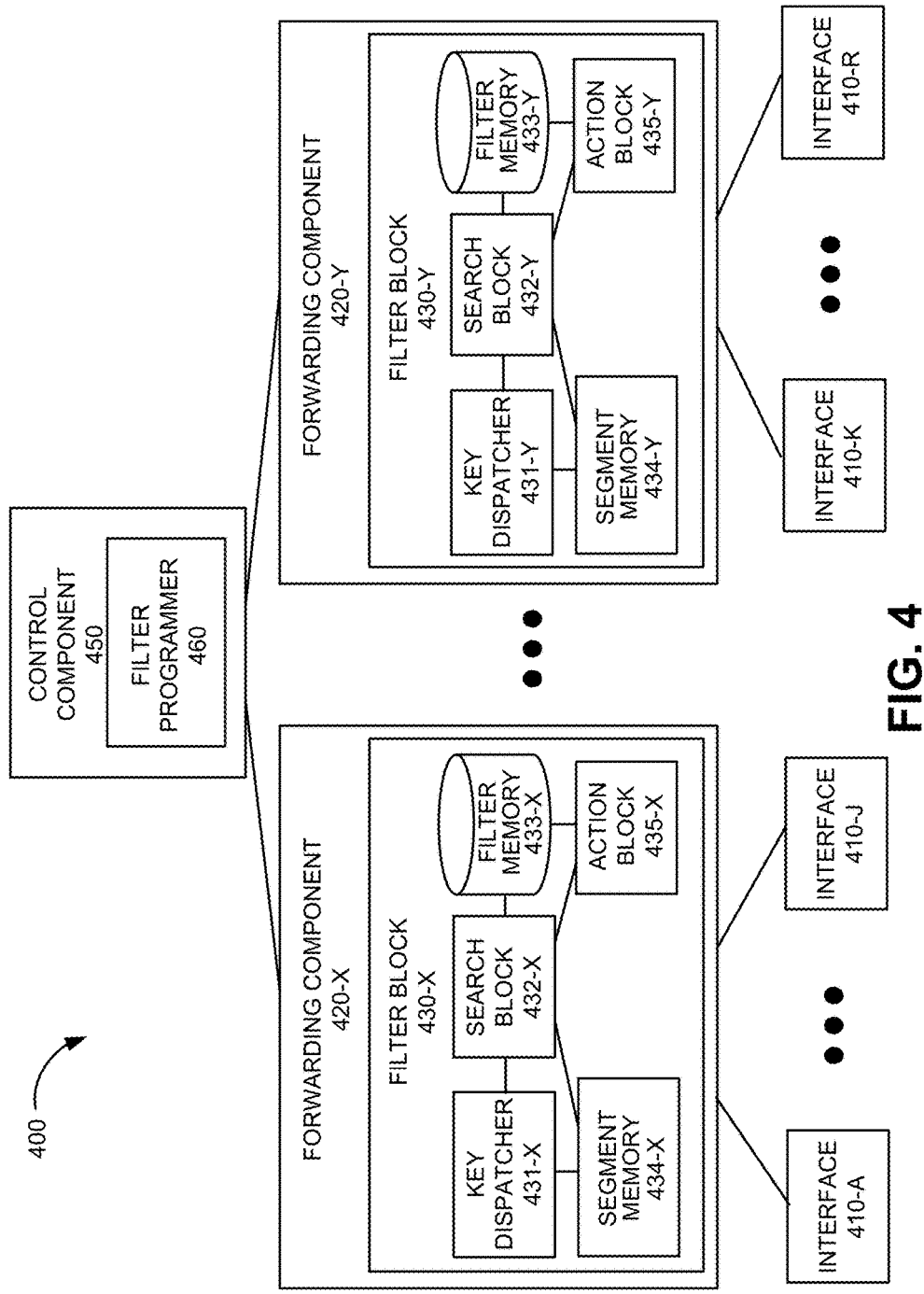
FIG. 4 is a diagram illustrating example functional components of a firewall of the environment of FIG. 2.

FIG. 4 is a diagram illustrating example functional components 400 of firewall 220. As shown in FIG. 4, firewall 220 may include one or more interfaces 410-A to 410-R (referred to herein collectively as "interfaces 410" and individually as "interface 410"), one or more forwarding components 420-X to 420-Y (referred to herein collectively as "forwarding components 420" and individually as "forwarding component 420"), and a control component 450. These functional components 400 are implemented in hardware, firmware, and/or a combination of hardware and software. For example, one or more of these functional components 400 can be implemented by processor 320, memory 330, and/or storage component 340.

Interface 410 may be associated with one or more physical ports and/or one or more logical ports. Interface 410 may receive packets from another interface 410 or from a remote interface of a device external to firewall 220 and/or may send packets to another interface 410 or to a remote interface of a device external to firewall 220.

Forwarding component 420 may perform data plane processing (e.g., routing, destination processing, etc.) for a set of interfaces 410. For example, forwarding component 420-X may perform data plane processing for interfaces 410-A through 410-J. Forwarding component 420 may receive a packet from a particular interface 410 and may look up a destination interface 410 for the packet in a forwarding table.

Forwarding component 420 may include a filter block 430. Filter block 430 may function as a firewall that filters packets based on one or more filters. Filter block 430 may include, for example, a key dispatcher 431, a search block 432, a filter memory 433, a segment memory 434, and an action block 435.

Filter block 430 may process a packet according to one or more filters. Key dispatcher 431 may generate one or more keys based on data included in the packet and based on a filter type associated with the one or more filters. Key dispatcher 431 may forward the one or more keys to search block 432. Search block 432 may search the one or more keys with respect to the one or more filters by comparing the one or more keys with conditions of filter rules associated with the one or more filters. Search block 432 may access filter memory 433 during the search. Filter memory 433 may store the filter rules.

Search block 432 may generate a set of match vectors that identify applicable filter rules, and may store the set of match vectors. Search block 432 may partition the match vectors into segments. Segment memory 434 may store summary vectors that describe the match vectors and/or location information that identifies storage locations of the segments.

Action block 435 may perform one or more actions specified by a filter rule that applies to a packet. For example, action block 435 may accept a packet, reject a packet, copy a packet, modify a traffic class associated with a packet, add, remove, or change a label associated with a packet, change a domain associated with a packet, increment a counter associated with a packet, or the like. Action block 435 may determine applicable filter rules by reference to the summary vectors and/or location information stored by segment memory 434, by reference to the match vectors stored by filter block 430, and by reference to the one or more filters stored by filter memory 433.

Control component 450 may program forwarding component 420. For example, control component 450 may perform control plane processing for forwarding components 420. In one example, if forwarding component 420 includes a forwarding table, control component 450 may include a routing table and may use the routing table to generate and/or update the forwarding table.

Control component 450 may include filter programmer 460. Filter programmer 460 may program filters stored in filter memory 433. For example, filter programmer 460 may receive filter specifications associated with a filter, may generate filter rules for the filter, and may store the generated filter rules in filter memory 433. Filter programmer 460 may generate a match vector that indicates filter rules that are applicable to a packet (e.g., based on an interface 410 that the packet is received from and/or destined for, etc.). Filter programmer 460 may determine that a filter exceeds a threshold size, and may partition the filter and/or the match vector based on the threshold size. Filter programmer 460 may generate a summary vector, that indicates segments of the filter that include applicable filter rules, based on the match vector and/or the filter.

Although FIG. 4 shows example functional components of firewall 220, in other implementations, firewall 220 may include fewer functional components, different functional components, differently arranged functional components, and/or additional functional components than the functional components depicted in FIG. 4. Additionally, or alternatively, one or more functional components of firewall 220 may perform one or more tasks described as being performed by one or more other functional components of firewall 220.

Figure 5:
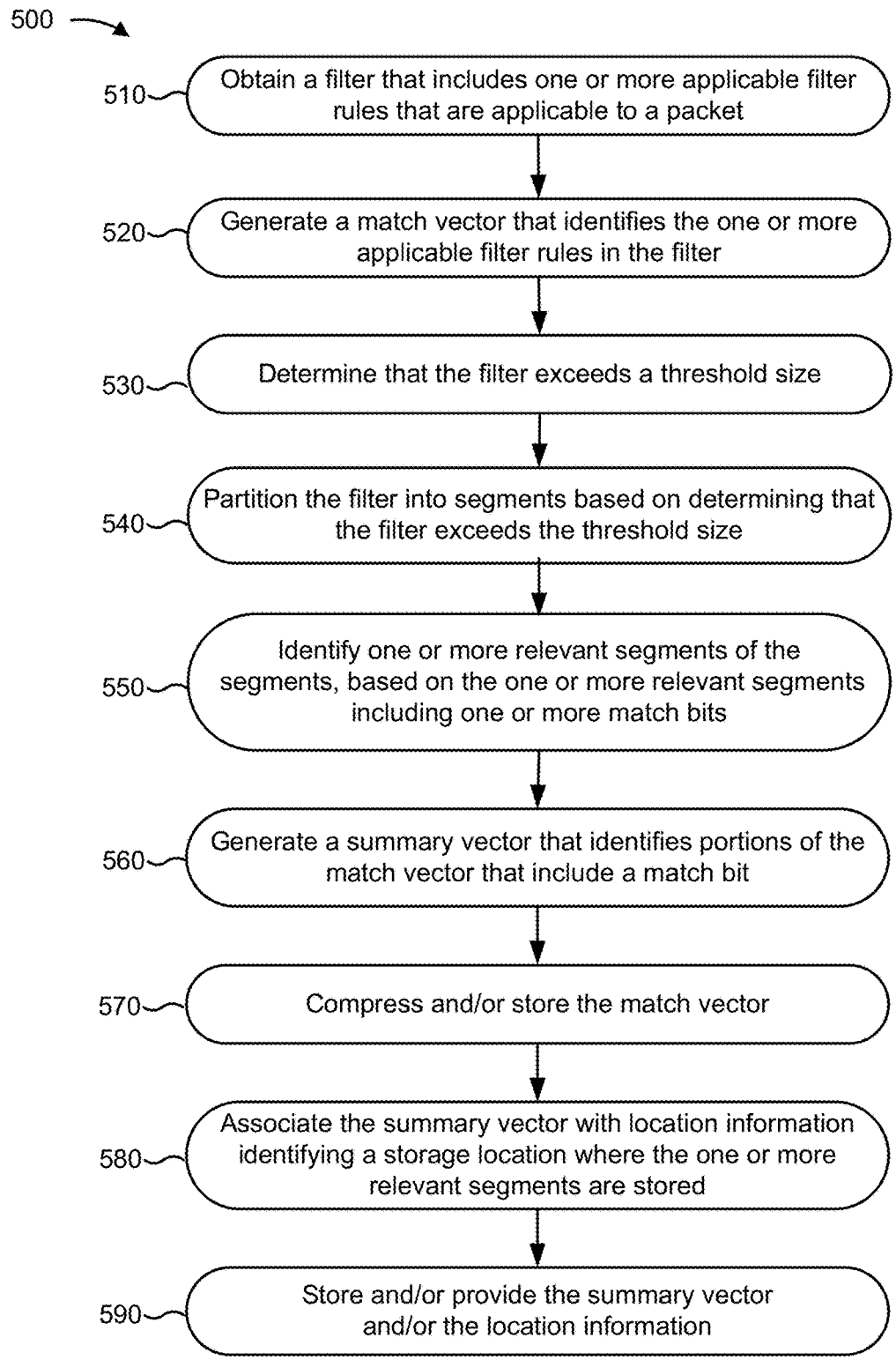
FIG. 5 is a flow chart of an example process for generating a filter and storing a summary vector that describes portions and/or segments of the filter.

FIG. 5 is a flow chart of an example process 500 for generating a filter and storing a summary vector that describes portions and/or segments of the filter. In some implementations, one or more process blocks of FIG. 5 may be performed by firewall 220. In some implementations, one or more process blocks of FIG. 5 may be performed by another device or a group of devices separate from or including firewall 220, such as network device 210.

As shown in FIG. 5, process 500 may include obtaining a filter that includes one or more applicable filter rules that are applicable to a packet (block 510). For example, firewall 220 may obtain a filter, and may enforce filter rules that are described in the filter. The filter rules may associate packet information of a packet with an action to perform on the packet. The packet information may include a source IP address of a packet, a destination IP address of a packet, a protocol of a packet, a source network port of the packet, a destination network port of the packet, or the like. When a packet matches the condition of a filter rule, firewall 220 or another device may perform the action associated with the filter rule. Firewall 220 may perform a search of the filter to identify one or more applicable filter rules that match packet information (e.g., of a packet, of a set of packets, etc.).

In some implementations, firewall 220 (e.g., filter programmer 460 of firewall 220) may generate a filter based on a filter specification. For example, firewall 220 may receive a filter specification that describes filter rules of a particular filter and/or certain packets to which the particular filter may be applicable. The particular filter may be applicable to certain packets based on the certain packets being associated with a particular source address, a particular destination address, a particular interface 410, or the like. Firewall 220 may generate the filter based on the filter specification, and may store the filter locally (e.g., in filter memory 433). As further shown in FIG. 5, process 500 may include generating a match vector that identifies the one or more applicable filter rules in the filter (block 520). For example, firewall 220 may identify one or more applicable filter rules that may be applicable to a packet based on a source of the packet, a destination of the packet, a particular interface 410 that the packet is received on and/or routed to, or the like. Firewall 220 may generate a match vector, using a vector of bits to correspond to filter rules of the filter, to identify the one or more applicable filter rules. In some implementations, firewall 220 may store the match vector locally and/or may provide the match vector to another device, component, or the like.

A size of the match vector may be based on a size of the filter. For example, a filter that includes 256 filter rules may be represented by a match vector of 256 bits. Each bit of the match vector may correspond to a different filter rule. For example, a fourth bit of the match vector may correspond to a fourth filter rule of the filter. A bit corresponding to an applicable filter rule may be set to a bit value indicating that the filter rule is an applicable filter rule, and may be referred to herein as a "match bit."

A particular match vector may correspond to a particular search of a filter and/or to particular packet information. For example, firewall 220 may generate four match vectors based on particular packet information. A first match vector may correspond to filter rules applicable to a packet associated with a source IP address, a second match vector may correspond to filter rules applicable to a packet associated with a destination IP address, a third match vector may correspond to filter rules applicable to a packet associated with a source network port, and a fourth match vector may correspond to filter rules applicable to a packet associated with a destination network port. Firewall 220 may compare the four match vectors to determine a similarly positioned match bit included in all four match vectors, and may perform an action based on a filter rule identified by the similarly positioned match bit, as described in more detail below.

As further shown in FIG. 5, process 500 may include determining that the filter exceeds a threshold size (block 530). For example, firewall 220 (e.g., filter programmer 460 of firewall 220) may determine whether the filter exceeds a threshold size. For example, firewall 220 may determine that a filter that contains 300 filter rules exceeds a threshold size of 256 filter rules. In some implementations, the threshold size may be based on a constraint of firewall 220, such as a processing speed, a storage capacity, or the like.

In some implementations, firewall 220 may determine the threshold size based on a storage size of the match vector and/or a number of bits included in the match vector. For example, assume that firewall 220 is incapable of processing match vectors larger than 256 bits. In that case, firewall 220 may determine a threshold size of 256 bits (e.g., corresponding to 256 filter rules of a filter). In some implementations, firewall 220 may determine the threshold size based on a performance constraint. For example, firewall 220, or a user of firewall 220 (e.g., a network administrator, a computer programmer, etc.) may want to improve latency or processing speed of firewall 220. Firewall 220 may determine a threshold size based on improving the latency or the processing speed by a particular amount.

As further shown in FIG. 5, process 500 may include partitioning the filter into segments based on determining that the filter exceeds the threshold size (block 540). For example, firewall 220 (e.g., filter programmer 460 of firewall 220) may determine that the filter exceeds the threshold size, and may partition the filter into two or more segments. By partitioning the filter into segments, firewall 220 may enable filter block 430 to identify and/or apply filter rules using filters larger than the threshold size.

A filter may be partitioned into segments based on a size of the filter. For example, a filter of 1,024 filter rules may be partitioned into four segments of 256 filter rules, eight segments of 128 filter rules, or so on. In some implementations, firewall 220 may partition match vectors corresponding to a filter. For example, firewall 220 may partition the match vectors into four segments of 256 bits, eight segments of 128 bits, or so on, based on a corresponding quantity of segments and filter rules of a partitioned filter. As another example, a match vector of 286 bits may be partitioned into 8 segments of 32 bits and a ninth segment of 30 bits. In some implementations, the ninth segment may include 32 bits, of which two bits are unused (e.g., non-match, etc.) bits, which may simplify memory addressing of the ninth segment.

As further shown in FIG. 5, process 500 may include identifying one or more relevant segments of the segments, based on the one or more relevant segments including one or more match bits (block 550). For example, firewall 220 may determine one or more relevant segments. A relevant segment may be a segment of the match vector and/or the filter that includes at least one match bit and/or a filter rule. That is, a relevant segment of a match vector is a segment that identifies an applicable filter rule of a segment of a filter. Firewall 220 may compare a relevant segment of multiple match vectors to determine whether a particular filter rule is applicable to a particular packet (e.g., based on whether all of the match vectors include a similarly positioned match bit corresponding to the particular filter rule).

As further shown in FIG. 5, process 500 may include generating a summary vector that identifies portions of the match vector that include a match bit (block 560). For example, firewall 220 may generate a summary vector. The summary vector may identify one or more portions of the match vector that contain a match bit. In some implementations, the summary vector may be of a size equal to the threshold size. In some implementations, the summary vector may be of a size less than the threshold size. Firewall 220 may compress and/or store the summary vector, as described in more detail below.

In some implementations, the match vector may include a quantity of portions equal to a quantity of bits in the summary vector. In some implementations, the portions may be equally sized (e.g., may contain an equal quantity of bits). Each bit of the summary vector may correspond to a different portion of the match vector. A match bit in the summary vector may indicate that a corresponding portion of the match vector includes at least one match bit. For example, firewall 220 may perform a bitwise "OR" operation on the corresponding portion, and may assign a value to the bit of the summary vector based on a result of the bitwise "OR" operation.

In some implementations, the portions of the match vector may be of a size equal to a size of the match vector divided by a size of the summary vector. For example, a 2,048-bit match vector that is described by a 256-bit summary vector may correspond to portions of 8 bits each, and each bit of the summary vector may correspond to a different 8-bit portion of the match vector. A size of a portion of the match vector may be referred to herein as a summary width. For example, in the above case, the portions are of a summary width of 8 bits.

A portion of a match vector may be of a different size than a segment of a match vector, in some implementations. For example, a 1,024-bit match vector may be comprised of 8-bit portions, 16-bit portions, or another summary width of portions. Firewall 220 may partition the 1,024-bit match vector into segments of, for example, 256 bits. Firewall 220 may obtain and/or decompress a segment based on the segment containing at least one portion that includes a match bit, as indicated by a summary vector associated with the match vector.

A summary vector may be associated with portions of a larger summary width or a smaller summary width. For example, a summary vector may be associated with portions of a summary width of two bits, four bits, eight bits, sixteen bits, or the like. A portion of a smaller size may describe a match vector with more accuracy and may require more processing power and/or storage space. Additionally, or alternatively, a portion of a larger size may require less resources for firewall 220 to process and/or store, but may describe the match vector at a lower level of precision. For example, a larger portion may be more likely to cause a false positive match based on the larger portion comprising more bits, of which two or more non-similarly positioned match bits may cause a false positive match.

As further shown in FIG. 5, process 500 may include compressing and/or storing the match vector (block 570). For example, firewall 220 may compress and/or store the match vector. In some implementations, firewall 220 may store the match vector locally and/or in a short-term memory, which may improve performance and/or reduce latency of firewall 220. In some implementations, firewall 220 may store the match vector remotely and/or in a long-term memory, which may reduce local memory requirements and/or may reduce power consumption of firewall 220.

In some implementations, firewall 220 may compress a relevant segment to generate a compressed relevant segment. For example, firewall 220 may read the relevant segment to determine a series of bits with a similar value within the relevant segment. Rather than storing each of the series of bits using a separate bit, firewall 220 may include, in the compressed relevant segment, information indicating a quantity of consecutive bits of the series of bits and a value (e.g., match, non-match, one, zero, etc.) of the series of bits. In this way, firewall 220 may compress the relevant segment, which may reduce an amount of local storage space and/or processing power used to filter the packets, and may enable firewall 220 to efficiently store relevant segments of increased size.

As further shown in FIG. 5, process 500 may include associating the summary vector with location information identifying a storage location where the one or more relevant segments are stored (block 580). For example, firewall 220 may store the one or more relevant segments. Firewall 220 may determine location information that identifies storage locations (e.g., memory addresses, network addresses, etc.) where the one or more relevant segments are stored. Firewall 220 may associate the summary vector with the location information (e.g., by concatenating the summary vector and the location information in a vector).

In some implementations, the location information of a relevant segment may identify a storage location where the match vector is stored, and an offset from the storage location where the match vector is stored. For example, assume that a relevant segment includes bits 24 through 48 of a match vector. The location information may identify a memory address of an origin (e.g., bit 0) of the match vector, and an offset identifier that identifies an offset of 24 bits from the origin of the match vector. Firewall 220 may use the memory address and the offset identifier to locate the relevant segment.

In some implementations, the location information may include information related to compression of the compressed relevant segments. For example, the location information may include information to enable firewall 220 and/or another device to decompress the compressed relevant segments, such as a decompression algorithm, or the like.

As further shown in FIG. 5, process 500 may include storing and/or providing the summary vector and/or the location information (block 590). For example, firewall 220 may store and/or provide the summary vector and/or the location information. In some implementations, firewall 220 may concatenate and store the summary vector and the location information. In some implementations, a first component of firewall 220 may provide the summary vector and/or the location information to a second component of firewall 220. For example, search block 432 may perform the search of the filter, may generate, partition, and/or compress the match vector, and may provide the summary vector and/or the location information to action block 435 (e.g., for determining an applicable filter rule to apply, for performance of the action indicated by the filter rule, etc.). In some implementations, firewall 220 may compress the summary vector to generate a compressed summary vector.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
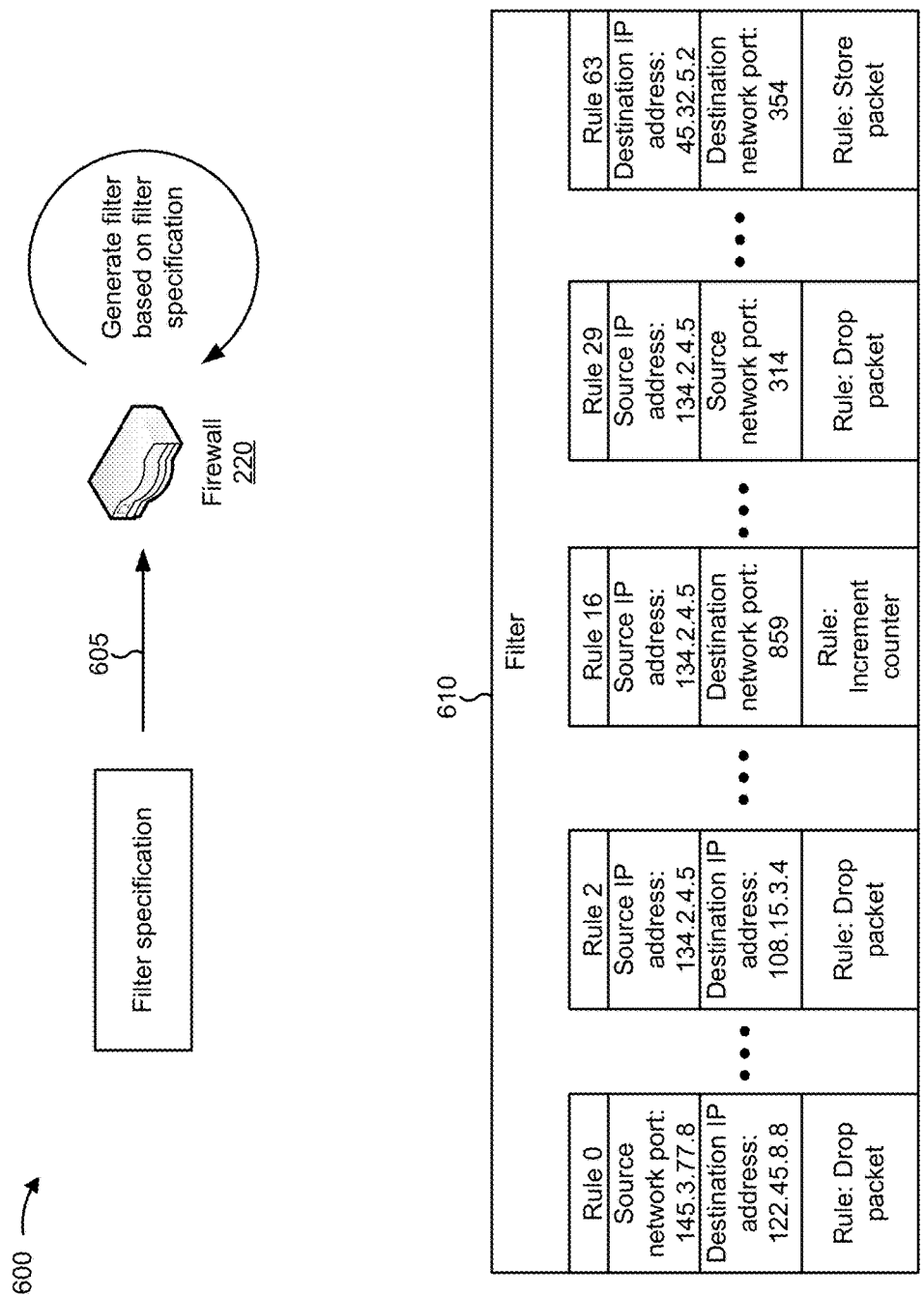
FIGS. 6A-6C are diagrams of an example implementation relating to the example process shown in FIG. 5.
Figure 6B:
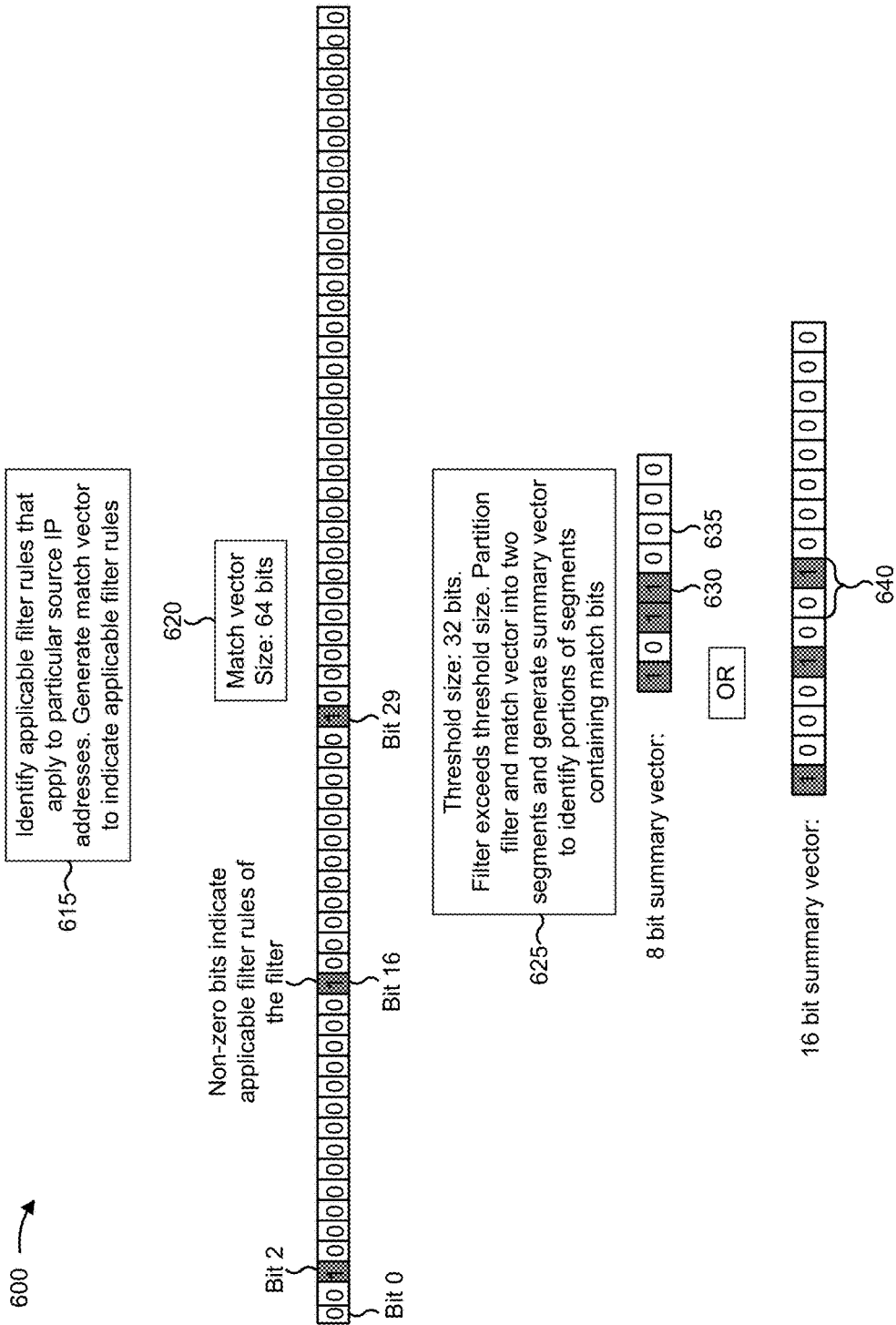
Figure 6C:
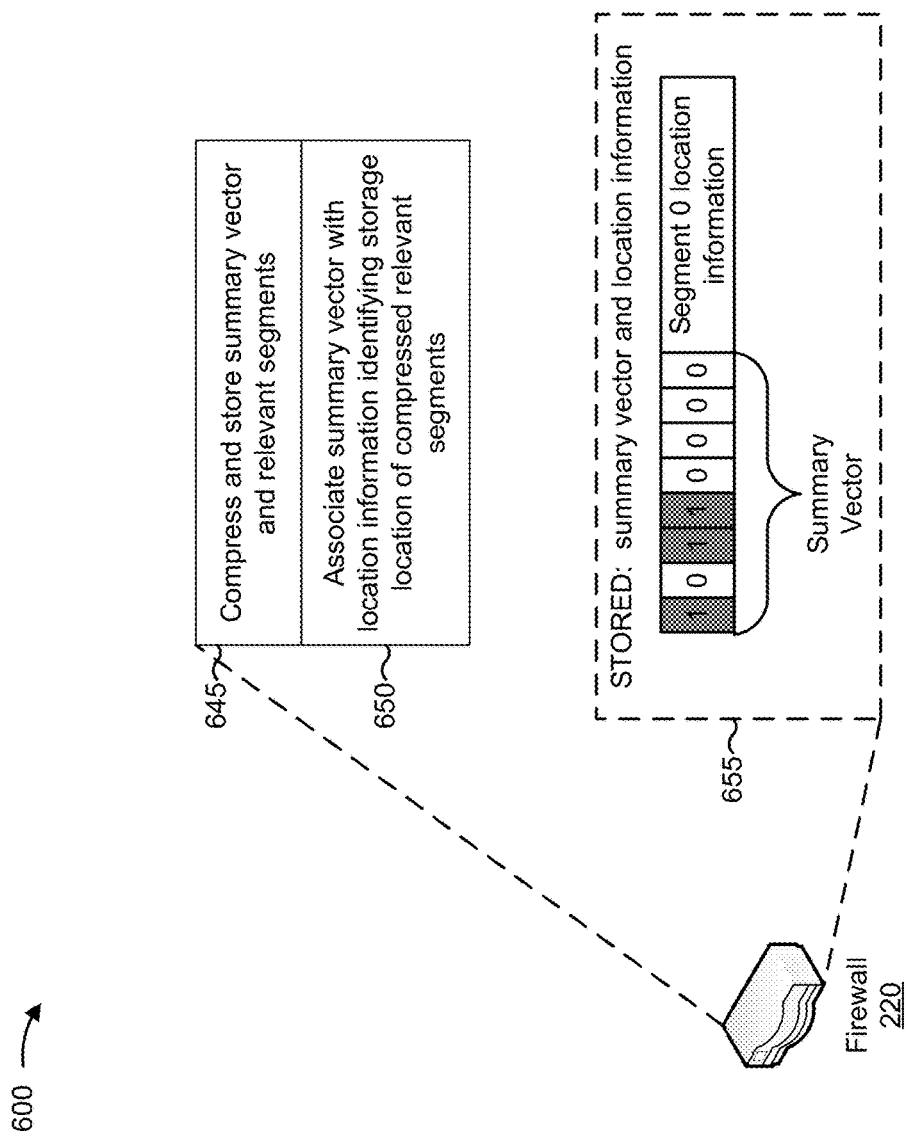

FIGS. 6A-6C are diagrams of an example implementation 600 relating to example process 500 shown in FIG. 5. FIGS. 6A-6C show an example of generating a filter and storing a summary vector that describes portions and/or segments of the filter. For the purpose of FIGS. 6A-6C, assume that filter memory 433 stores a filter including 64 filter rules.

As shown in FIG. 6A, and by reference number 605, firewall 220 may receive a filter specification. Assume that the filter specification describes filter rules of a particular filter, and assume that the filter specification describes packets to which the filter rules may be applicable. As shown, assume that firewall 220 (e.g., filter programmer 460 of firewall 220) generates a filter based on the filter specification. As shown by reference number 610, some filter rules of the filter may be applicable to packets associated with particular source IP addresses, particular destination IP addresses, particular source network ports, and/or particular destination network ports. Here, Rule 2, Rule 16, and Rule 29 are applicable to packets associated with particular source IP addresses.

As further shown, the filter rules may be applicable to packets associated with other packet information. Here, Rule 2 is applicable to packets associated with a destination IP address of 108.15.3.4, Rule 16 is applicable to packets associated with a destination network port of 859, and Rule 29 is applicable to packets associated with a source network port of 314. Assume that all of the packet information must match a filter rule for the filter rule to be applicable a packet. For example, Rule 2 is applicable to a packet only if the packet is associated with a source IP address of 134.2.4.5 and a destination IP address of 108.15.3.4.

As shown in FIG. 6B, and by reference number 615, firewall 220 may identify filter rules that apply to particular source IP addresses (e.g., to facilitate searching, by firewall 220, for applicable filter rules based on a particular source IP address). As further shown, assume that firewall 220 generates a match vector to identify the applicable filter rules. As shown by reference number 620, the match vector may include 64 bits. As shown, bit 2, bit 16, and bit 29 may be match bits, based on rule 2, rule 16, and rule 29 being applicable to packets associated with a particular source IP address. For the purpose of FIGS. 6A-6C, assume that a bit with a value of "1" indicates a match bit, and assume that a bit with a value of "0" indicates a bit that is not associated with an applicable filter rule (e.g., a non-match bit).

As shown by reference number 625, firewall 220 may determine that the filter exceeds a threshold size of 32 filter rules. Assume that firewall 220 partitions the filter into two segments of 32 filter rules, and that firewall 220 partitions the match vector into two segments of 32 bits (e.g., based on the threshold size being 32 filter rules). As shown, firewall 220 may generate a summary vector to identify portions of the filter and/or the match vector that include a match bit.

Here, an eight-bit summary vector is shown, corresponding to eight portions of the filter and/or the match vector. Here, each 32-bit segment of the match vector includes four portions of eight bits each. A sixteen-bit summary vector is also shown for illustrative purposes, and would correspond to sixteen portions of the match vector, in the case when firewall 220 divides the match vector into sixteen segments of four bits.

As shown by reference number 630 and by reference number 635, the summary vector may include match bits corresponding to portions of the match vector that include a match bit, and may include non-match bits corresponding to a remainder of the portions. Here, a first bit of the eight-bit summary vector corresponds to a first eight bits of the match vector, a second bit of the eight-bit summary vector corresponds to a second eight bits of the match vector, and so on. As shown, a first bit, a third bit, and a fourth bit of the summary vector are match bits (e.g., based on bit 2, bit 16, and bit 29 of the match vector being match bits, and based on bit 2, bit 16, and bit 29 being included in a first eight-bit portion, a third eight-bit portion, and a fourth eight-bit portion of the match vector, respectively). As shown by reference number 640, a sixteen-bit summary vector may identify the relevant segments at a higher level of detail. A first bit of the sixteen-bit summary vector may correspond to a first four bits of the match vector, a second bit of the sixteen-bit summary vector may correspond to a second four bits of the match vector, and so on. The sixteen-bit summary vector may use additional memory, and may enable firewall 220 to reduce a quantity of false positive matches.

As shown in FIG. 6C, and by reference number 645, firewall 220 may compress and store the summary vector and the relevant segment (e.g., segment 0, including bit 0 through bit 31). Assume that firewall 220 stores the summary vector and the relevant segment locally. As shown by reference number 650, firewall 220 may associate the summary vector with location information. As further shown, the location information may identify a storage location of the compressed relevant segment. As shown by reference number 655, firewall 220 may store a vector that includes the summary vector and the location information. Based on the vector that includes the summary vector and the location information, action block 435 may identify and/or obtain the relevant segment, and may compare the relevant segments to relevant segments associated with other searches, to determine an applicable filter rule.

As indicated above, FIGS. 6A-6C are provided merely as an example. Other examples are possible and may differ from what was described with regard to FIGS. 6A-6C.

Figure 7:
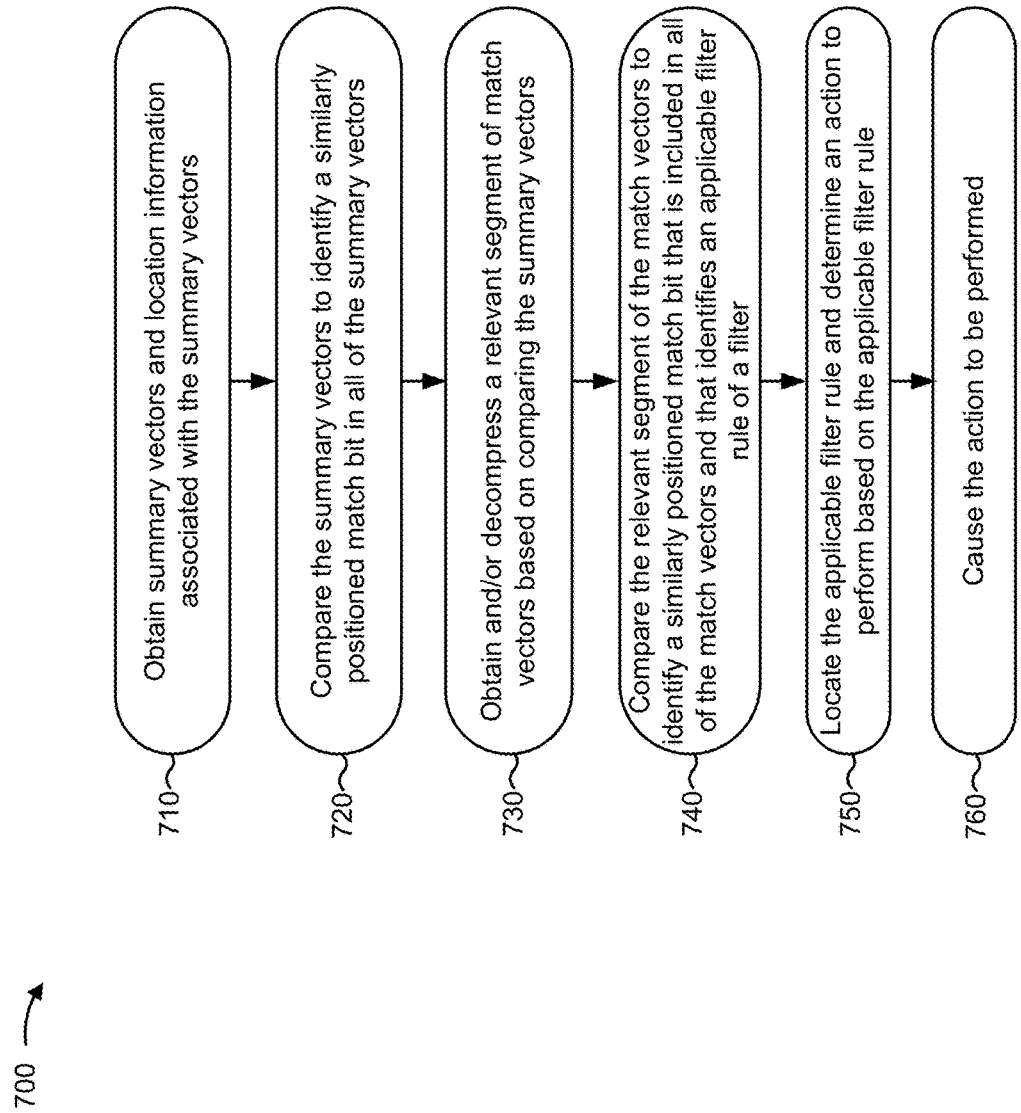
FIG. 7 is a flow chart of an example process for determining a filter rule to apply based on a summary vector and relevant segments of a match vector.

FIG. 7 is a flow chart of an example process 700 for determining a filter rule to apply based on a summary vector and relevant segments of a match vector. In some implementations, one or more process blocks of FIG. 7 may be performed by firewall 220. In some implementations, one or more process blocks of FIG. 7 may be performed by another device or a set of devices separate from or including firewall 220, such as network device 210.

As shown in FIG. 7, process 700 may include obtaining summary vectors and location information associated with the summary vectors (block 710). For example, firewall 220 may obtain summary vectors and location information associated with the summary vectors. In some implementations, firewall 220 may obtain the summary vectors and/or location information based on firewall 220 generating the summary vectors. For example, firewall 220 (e.g., filter programmer 460 of firewall 220) may generate and/or store the summary vectors, and search block 432 of firewall 220 may obtain the summary vectors and/or location information based on filter programmer 460 generating and/or storing the summary vectors. The summary vectors may identify portions and/or relevant segments of match vectors that contain a match bit. The location information may identify locations where the relevant segments are stored. Firewall 220 may use the summary vectors and/or the location information to identify and/or obtain the relevant segments for comparison to determine a filter rule that is applicable to a particular packet.

In some implementations, firewall 220 may obtain summary vectors and/or location information based on performing a search. For example, firewall 220 may receive a packet, and may obtain keys (e.g., from key dispatcher 431) based on packet information associated with the packet. Firewall 220 (e.g., search block 432 of firewall 220) may perform a search based on the keys. A result of the search may indicate a location of a summary vector. For example, assume that firewall 220 performs a search based on a packet associated with a particular source IP address. Firewall 220 may determine a result of the search that indicates a location of a summary vector corresponding to a match vector associated with particular source IP addresses. Firewall 220 may obtain, from the location, the summary vector and/or location information associated with the summary vector.

In some implementations, firewall 220 may perform the search based on a key from key dispatcher 431. For example, key dispatcher 431 may receive a packet, and may dispatch, to search block 432, a key based on the packet. Key dispatcher 431 may generate the key based on packet information. For example, the key may include one or more search terms based on the packet information. In some implementations, search block 432 may use the key to perform the search.

In some implementations, firewall 220 may use a key to perform multiple searches in parallel. For example, assume that firewall 220 receives a packet associated with a source IP address, a destination IP address, a source network port, and a destination network port. Key dispatcher 431 may generate and/or dispatch a key based on the source IP address, the destination IP address, the source network port, and the destination network port. In some implementations, firewall 220 may generate a single key to perform the search based on the source IP address, the destination IP address, the source network port, and the destination network port. In some implementations, firewall 220 may generate multiple keys for one or more of the source IP address, the destination IP address, the source network port, and/or the destination network port. Firewall 220 may perform, in parallel, a first search based on the source IP address to obtain a first match vector that is related to particular source IP addresses, a second search based on the destination IP address to obtain a second match vector that is related to particular destination IP addresses, a third search based on the source network port to obtain a third match vector that is related to particular source network ports, and a fourth search based on the destination network port to obtain a fourth match vector that is related to particular destination network ports. In this way, firewall 220 may improve latency of filtering operations by performing multiple searches in parallel.

In some implementations, firewall 220 may perform one or more searches in series. For example, consider a first type of packet information, a second type of packet information, and a third type of packet information. Assume that the first type of packet information, the second type of packet information, and the third type of packet information are associated with filter rules of a highest priority, filter rules of a lower priority, and filter rules of a lowest priority, respectively. In this case, firewall 220 may perform a first search based on the first type of packet information, or may perform, in parallel, multiple searches based on the first type of packet information. Firewall 220 may perform, in series, a second search based on the second type of packet information and a third search based on the third type of packet information. For example, firewall 220 may perform the third search after the second search. In this way, firewall 220 may perform searches for low-priority filter rules in series, which may reduce processing power requirements of firewall 220.

In some implementations, firewall 220 may store the summary vectors and/or the location information locally. For example, segment memory 434 may store the summary vectors and/or the location information. Firewall 220 may access segment memory 434 to determine the relevant segments, in some implementations. For example, filter programmer 460 may generate, partition, and/or compress the match vector, and may store the summary vector and/or the location information in segment memory 434. In some implementations, search block 432 of firewall 220 may access segment memory 434 to obtain the summary vector and/or the location information (e.g., to perform a search of a filter associated with the summary vector).

As further shown in FIG. 7, process 700 may include comparing the summary vectors to identify a similarly positioned match bit in all of the summary vectors (block 720). For example, firewall 220 may obtain multiple summary vectors. Firewall 220 may compare the multiple summary vectors to identify a similarly positioned match bit in each of the multiple summary vectors. The similarly positioned match bit may indicate that a particular portion of multiple match vectors, associated with the multiple summary vectors, include or are included in a relevant segment. Based on the similarly positioned match bit, firewall 220 may obtain, decompress, and/or compare the relevant segments of the multiple match vectors to determine an applicable filter rule to apply.

As an example, assume that bit 0 is the only match bit of a first summary vector, and assume that bit 1 is the only match bit of a second summary vector. In that case, firewall 220 may perform a bitwise "AND" operation to determine that the first summary vector and the second summary vector do not share a similarly positioned match bit (e.g., based on bit 0 being a different bit than bit 1). As another example, assume that bit 0 is a match bit in the first summary vector and the second summary vector. In that case, firewall 220 may perform a bitwise "AND" operation to determine that bit 0 of the first summary vector and the second summary vector is a match bit in both of the summary vectors. Based on bit 0 of the first summary vector and the second summary vector being a similarly positioned match bit, firewall 220 may obtain a segment of a first match vector and a second match vector that corresponds to bit 0 of the first summary vector and the second summary vector, respectively.

In some cases, firewall 220 may obtain a segment based on a false positive match. For example, a segment of a first match vector may contain a first match bit corresponding to a first filter rule, and a corresponding segment of a second match vector may contain a second match bit corresponding to a second filter rule that is different than the first filter rule. In this case, the summary vectors of the first match vector and the second match vector may indicate that the segment is a relevant segment. However, by performing a bitwise "AND" operation on the segment of the first match vector and the second match vector, firewall 220 may determine that the first match bit and the second match bit are not similarly positioned bits. In such cases, firewall 220 may determine a second relevant segment based on the summary vectors, and may obtain and/or compare the second relevant segment. In some implementations, firewall 220 may reduce a quantity of false positive results by partitioning the match vectors into shorter portions and/or segments, which may improve accuracy of the summary vectors.

In some implementations, firewall 220 (e.g., filter programmer 460 of firewall 220) may reduce a quantity of false positive matches by grouping filter rules based on a match type of the filter rules. For example, certain filter rules may apply to packets associated with a particular source IP address and any destination address, associated with a particular destination IP address and any source IP address, or the like. The certain filter rules may cause summary vectors associated with segments containing the certain filter rules to indicate that the segments containing the certain filter rules are relevant segments, for packets associated with any source IP address, with any destination IP address, or the like. In short, based on the summary vectors, the certain filter rules may appear to apply to packets associated with any source IP address, with any destination IP address, or the like, which may lead to false positive matches, especially when the certain filter rules are dispersed throughout a filter. Firewall 220 may reduce a quantity of false positive matches by grouping the certain filter rules based on match conditions. For example, firewall 220 may group all filter rules that match packets associated with a particular source IP address, all filter rules that match packets associated with a particular destination IP address, and so on. In this way, firewall 220 may reduce a quantity of false positive matches by grouping filter rules based on a match type of the filter rules, which may improve filtering speed and/or efficiency of firewall 220.

As further shown in FIG. 7, process 700 may include obtaining and/or decompressing a relevant segment of match vectors based on comparing the summary vectors (block 730). For example, based on comparing the summary vectors and identifying a similarly positioned match bit, firewall 220 may obtain and/or decompress a relevant segment of one or more match vectors. In some implementations, firewall 220 may obtain and/or decompress the relevant segment based on location information associated with the summary vectors.

In some implementations, firewall 220 may obtain and/or decompress a relevant segment of multiple match vectors that are associated with multiple searches. For example, assume that firewall 220 performs four searches in parallel. In that case, firewall 220 may obtain and/or decompress a relevant segment of four match vectors that are determined based on performing the four searches in parallel. Firewall 220 may compare the relevant segment of the four match vectors, as described in more detail below.

Firewall 220 may locate the relevant segment based on location information. For example, segment memory 434 may store location information in association with the summary vectors, and firewall 220 may refer to the location information to locate the relevant segment. In some implementations, the location information may indicate a storage location of the match vectors and an offset to the relevant segment, and firewall 220 may locate the relevant segment of the match vectors based on the storage location and the offset.

As further shown in FIG. 7, process 700 may include comparing the relevant segment of the match vectors to identify a similarly positioned match bit that is included in all the match vectors and that identifies an applicable filter rule of a filter (block 740). For example, firewall 220 may obtain and/or decompress a relevant segment of multiple match vectors. Firewall 220 may compare the relevant segment of the multiple match vectors to determine whether a similarly positioned match bit of the relevant segment is included in all of the match vectors. The similarly positioned match bit may identify an applicable filter rule which, based on the similarly positioned bit being a match bit in all of the match vectors, is applicable to a packet.

In some cases, firewall 220 may fail to find a similarly positioned match bit in a first relevant segment of a set of match vectors. In such cases, firewall 220 may determine a second relevant segment of the set of match vectors based on summary vectors associated with the set of match vectors. Firewall 220 may obtain and/or decompress the second relevant segment of the set of the match vectors to find a similarly positioned match bit that is included in all of the match vectors, and so on.

As further shown in FIG. 7, process 700 may include locating the applicable filter rule and determining an action to perform based on the applicable filter rule (block 750). For example, based on identifying the similarly positioned match bit, firewall 220 may determine an applicable filter rule. The applicable filter rule may indicate one or more actions to perform on the packet. Firewall 220 may locate the applicable filter rule by referencing the filter than includes the applicable filter rule. In some implementations, the filter may be stored in filter memory 433. Firewall 220 may perform the one or more actions and/or cause the one or more actions to be performed, as described below.

As further shown in FIG. 7, process 700 may include causing the action to be performed (block 760). For example, firewall 220 may perform, or may cause network device 210 to perform, one or more actions indicated by an applicable filter rule. In some implementations, the applicable filter rule may cause firewall 220 to accept a packet, reject a packet, copy a packet, modify a traffic class associated with a packet, add, remove, or change a label associated with a packet, change a domain associated with a packet, increment a counter associated with a packet, or the like. In some implementations, firewall 220 may perform a combination of the above actions.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
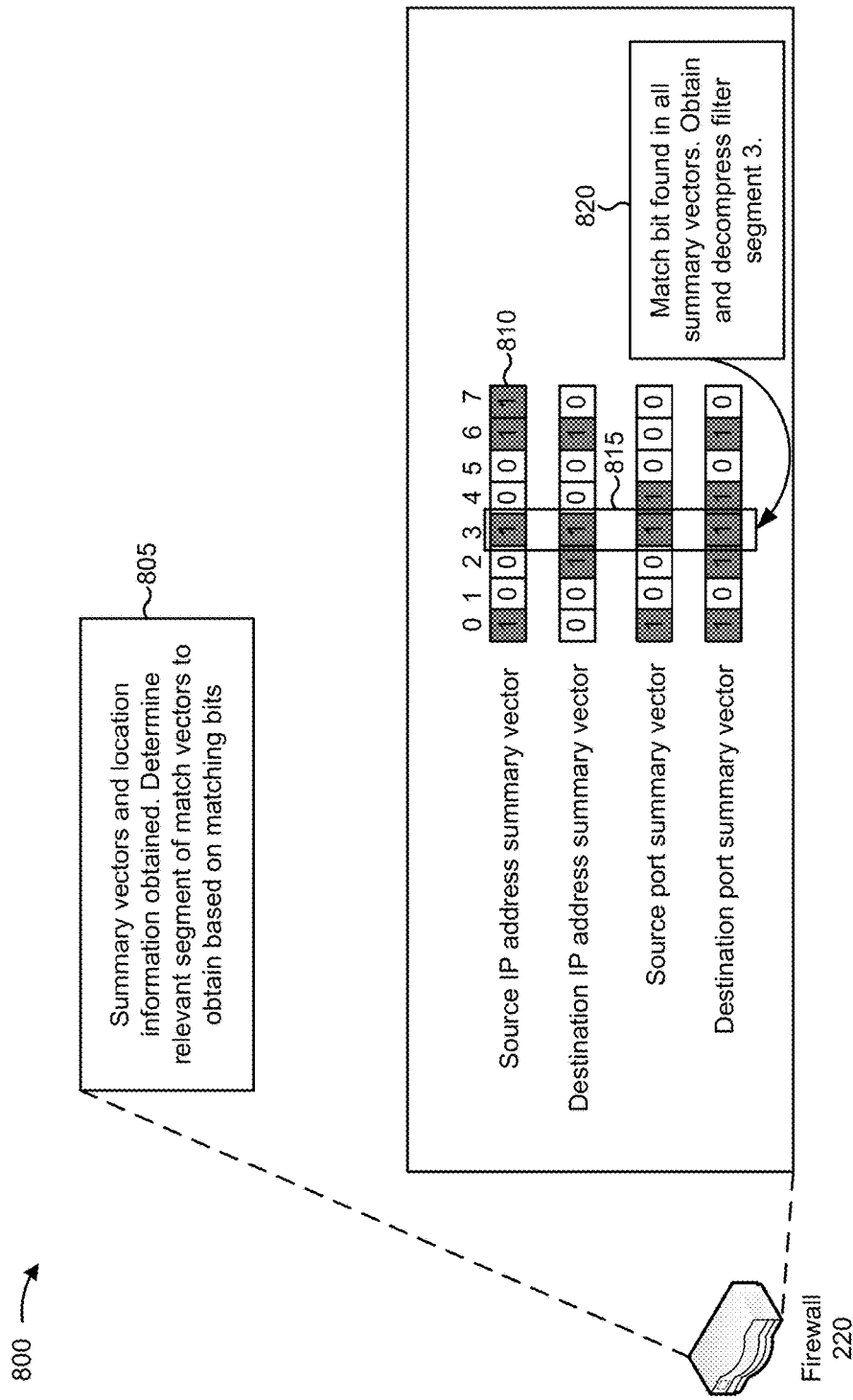
FIGS. 8A and 8B are diagrams of an example implementation relating to the example process shown in FIG. 7.
Figure 8B:
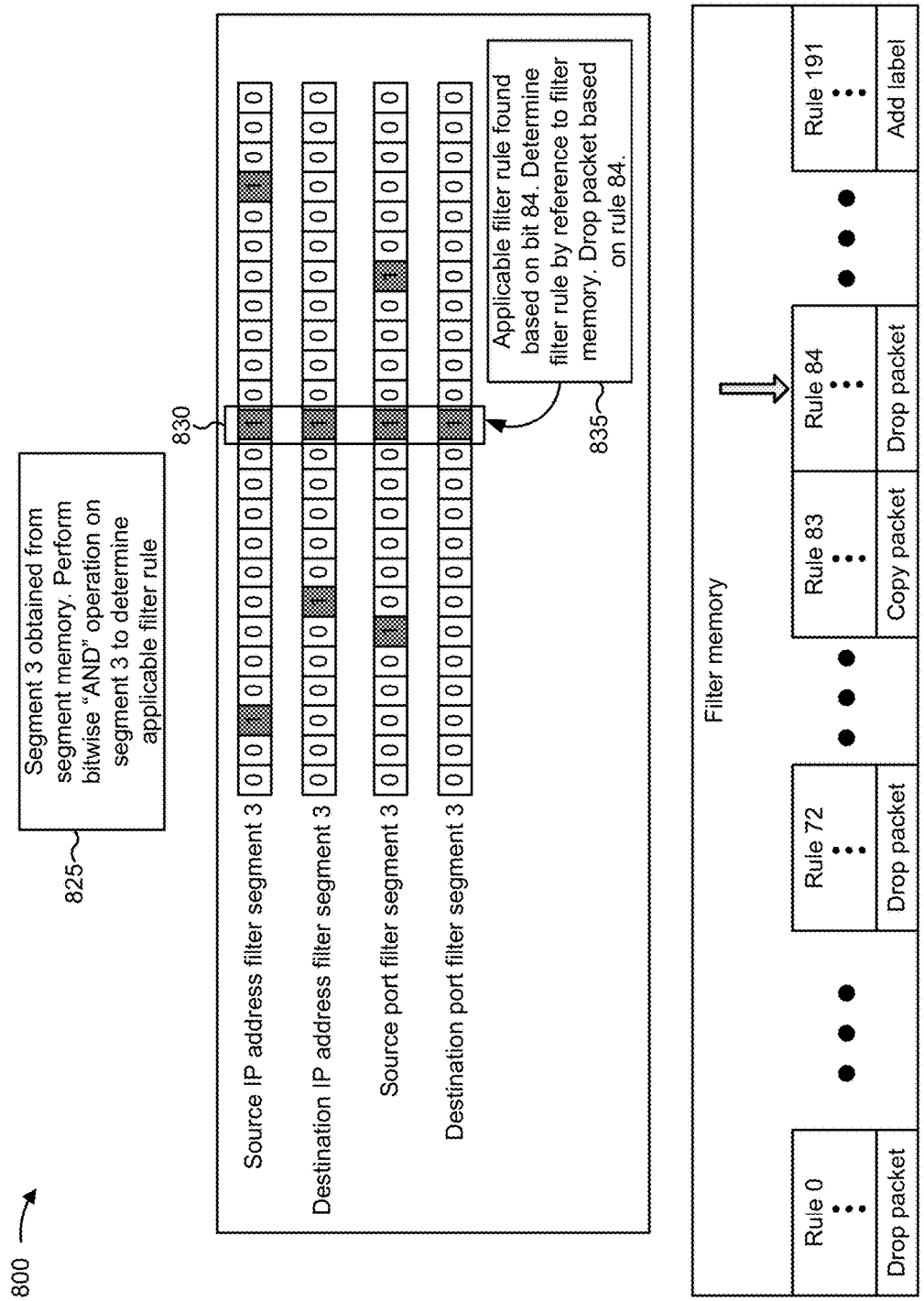

FIGS. 8A and 8B are diagrams of an example implementation 800 relating to example process 700 shown in FIG. 7. FIGS. 8A and 8B show an example of determining an action to perform based on a summary vector and a relevant segment of one or more match vectors. For the purposes of FIGS. 8A and 8B, assume that filter memory 433 stores a filter of 192 filter rules, described by four compressed match vectors that are each partitioned into eight segments of 24 bits, and assume that segment memory 434 stores summary vectors associated with the four compressed match vectors.

As shown in FIG. 8A, and by reference number 805, firewall 220 may obtain (e.g., from search block 432), summary vectors and location information associated with the summary vectors. Assume that firewall 220 obtains the summary vectors and location information based on receiving a packet for filtration and/or based on search block 432 performing a search to determine the summary vectors and location information. As shown by reference number 810, firewall 220 obtains four summary vectors: a first summary vector associated with a source IP address of the packet, a second summary vector associated with a destination IP address of the packet, a third summary vector associated with a source port of the packet, and a fourth summary vector associated with a destination port of the packet. As shown by reference number 815, firewall 220 may perform a bitwise "AND" operation on the summary vectors to identify a relevant segment of four match vectors associated with the summary vectors. Here, as shown by reference number 820, firewall 220 determines to obtain and decompress segment 3 based on segment 3 being associated with bit 3 of the four summary vectors, and based on bit 3 of the four summary vectors being a match bit in each of the four summary vectors. Assume that firewall 220 obtains and decompresses segment 3.

As shown in FIG. 8B, and by reference number 825, firewall 220 may compare segment 3 of each of the match vectors to determine whether a filter rule is applicable to the packet. As shown by reference number 830, firewall 220 may determine that a filter rule applies to the packet based on performing a bitwise "AND" operation on segment 3 of each of the match vectors. As shown by reference number 835, firewall 220 (e.g., action block 435 of firewall 220) may locate the applicable filter rule (e.g., by reference to filter memory 433), and may perform an action on the packet based on the applicable filter rule. Here, firewall 220 locates rule 84 based on a corresponding bit (e.g., bit 84) of the relevant segment being a match bit in each of the match vectors. As shown, assume that firewall 220 drops the packet based on rule 84.

As indicated above, FIGS. 8A and 8B are provided merely as an example. Other examples are possible and may differ from what was described with regard to FIGS. 8A and 8B.

Implementations described herein may enable a firewall to partition, into segments, a match vector that describes a filter, and to generate a summary vector that indicates which of the segments contain match bits. Based on summary vectors of two or more match vectors, the firewall may determine segments of the two or more match vectors to compare, to determine applicable filter rules. In this way, the firewall may reduce an amount of storage space used to store the match vector, may enable the network device to enforce arbitrarily large filters, may improve filtering speed, and may reduce latency of the firewall caused by filtering the packets.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a device, a match vector that indicates one or more filter rules that are potentially applicable to a packet,
        the packet being received by the device, and
        the one or more filter rules being included in a filter that includes a plurality of filter rules;
    partitioning, by the device, the match vector into a plurality of segments;
    determining, by the device, a summary width,
        the summary width identifying a quantity of consecutive bits of the match vector that correspond to one bit of a summary vector;
    generating, by the device, the summary vector based on the plurality of segments of the match vector and the summary width,
        the summary vector including a particular bit that corresponds to a first bit and a second bit of a segment of the plurality of segments of the match vector;
    determining, by the device, a particular filter rule, of the one or more filter rules, to apply to the packet based on the summary vector; and
    applying, by the device, the particular filter rule to the packet.

2. The method of claim 1,
    where the match vector is a first match vector; and
    where the summary vector is a first summary vector; and
    where the method further comprises:
        obtaining a second summary vector,
            the second summary vector corresponding to a second match vector, and
            the second match vector being different than the first match vector;
        comparing the first summary vector and the second summary vector to determine a first match bit,
            the first match bit identifying a relevant segment of the first match vector and a relevant segment of the second match vector, and
            the relevant segment of the first match vector being the segment of the match vector;
        obtaining the relevant segment of the first match vector and the relevant segment of the second match vector based on the first match bit;
        comparing the relevant segment of the first match vector and the relevant segment of the second match vector to determine that the relevant segment of the first match vector and the relevant segment of the second match vector contain a second match bit; and
        determining to apply the particular filter rule based on the second match bit indicating the particular filter rule.

3. The method of claim 2, further comprising:
    determining first applicable filter rules and second applicable filter rules based on first packet information and second packet information,
        the first packet information and the second packet information being associated with the packet, and
        the first packet information being different than the second packet information, and
        the first applicable filter rules being applicable to packets associated with the first packet information, and
        the second applicable filter rules being applicable to packets associated with the second packet information; and
    generating the first match vector and the second match vector based on the first applicable filter rules and the second applicable filter rules, respectively.

4. The method of claim 1, further comprising:
    generating the match vector;
    compressing the match vector to generate a compressed match vector; and
    storing the compressed match vector.

5. The method of claim 4, further comprising:
    compressing the summary vector to generate a compressed summary vector;
    storing the compressed summary vector; and
    storing, in association with the compressed summary vector, information for decompressing the compressed match vector.

6. The method of claim 1,
    where a first bit value of the summary vector indicates that a first corresponding portion of the match vector, that includes the quantity of consecutive bits of the summary width, includes at least one match bit, and
    where a second bit value of the summary vector indicates that a second corresponding portion of the match vector, that includes the quantity of consecutive bits of the summary width, does not include at least one match bit.

7. The method of claim 1, further comprising:
    storing, in association with the summary vector, location information that identifies a storage location of the segment,
        where generating the summary vector comprises:
            generating the summary vector based on the location information.

8. A device, comprising:
    a memory to store instructions; and
    one or more processors to execute the instructions to:
        generate a filter based on a filter specification, the filter specification identifying a plurality of filter rules, the plurality of filter rules being included in the filter;

identify one or more filter rules of the plurality of filter rules that are potentially applicable to a packet;

generate a match vector that identifies the one or more filter rules that are potentially applicable to the packet, the match vector identifying the one or more filter rules;

partition the match vector into segments;

determine a summary width, the summary width identifying a quantity of consecutive bits of the match vector that correspond to one bit of a summary vector;

generate the summary vector based on the segments of the match vector and the summary width, the summary vector including a bit that corresponds to a first bit and a second bit of a segment of the segments of the match vector;

identify, based on the summary vector, a particular filter rule of the one or more filter rules to apply to the packet; and apply the particular filter rule to the packet.

9. The device of claim 8, where the one or more processors are further to:

obtain a plurality of summary vectors that includes the summary vector, the plurality of summary vectors corresponding to a plurality of match vectors generated based on the filter, and the plurality of match vectors including the match vector; and compare the plurality of summary vectors to determine the segment, and where the one or more processors, when determining that the particular filter rule is applicable, are to:

determine that the particular filter rule is applicable to the packet based on the segment and each match vector of the plurality of match vectors.

10. The device of claim 9, where the one or more processors, when obtaining the plurality of summary vectors, are to:

perform, in parallel, a plurality of searches to obtain the plurality of summary vector.

11. The device of claim 8, where the one or more processors are further to:

store, in association with the summary vector, location information that identifies a storage location of the match vector and an offset identifier that identifies a storage location of the segment relative to the storage location of the match vector.

12. The device of claim 9, where the segment of the plurality of segments of the match vector is a second segment;

where the particular filter rule is a second filter rule; and where the one or more processors are further to:

compare the plurality of summary vectors to determine a first segment of the plurality of match vectors;

obtain the first segment of the plurality of match vectors;

determine, based on the first segment, that a first filter rule is not applicable to the packet; and obtain the second segment based on the first filter rule not being applicable to the packet.

13. The device of claim 9, where the one or more processors are further to:

decompress the plurality of summary vectors; and decompress the plurality of match vectors.

14. The device of claim 8, where the summary vector further includes another bit that is based on at least one of the first bit or the second bit of the match vector being a match bit.

15. A computer-readable medium storing instructions, the instructions comprising:

one or more instructions that, when executed by one or more processors, cause the one or more processors to:

obtain a filter that includes a plurality of filter rules that are possibly applicable to packets;

identify one or more filter rules of the plurality of filter rules that are possibly applicable to the packets;

generate a plurality of match vectors that identify the one or more filter rules;

partition the plurality of match vectors into segments;

determine a summary width, the summary width identifying a quantity of consecutive bits of a match vector, of the plurality of match vectors, that correspond to one bit of a summary vector;

generate, based on partitioning the plurality of match vectors into the segments and based on the summary width, a plurality of summary vectors corresponding to the plurality of match vectors, the plurality of summary vectors including the summary vector, and the summary vector including a particular bit that corresponds to a first bit and a second bit of a segment of the segments of the plurality of match vectors;

receive a packet, of the packets, that is associated with particular packet information;

obtain the segment, of the segments, based on the plurality of summary vectors determine a filter rule, of the one or more filter rules, to apply to the packet based on the segment and based on the particular packet information; and apply the filter rule to the packet.

16. The computer-readable medium of claim 15, where the one or more instructions, that cause the one or more processors to determine the filter rule to apply, further cause the one or more processors to:

compare the segment to identify a match bit included in each of the plurality of match vectors, the match bit corresponding to the filter rule to apply; and determine the filter rule to apply based on the match bit.

17. The computer-readable medium of claim 16, where the segment is a second relevant segment; and where the filter rule is a second filter rule; and where the one or more instructions further cause the one or more processors to:

determine a first relevant segment of the segments of the plurality of match vectors;

determine that a first filter rule is not applicable to the packet based on the first relevant segment; and where the one or more instructions, that cause the one or more processors to determine the filter rule, cause the one or more processors to:

determine the second filter rule based on the first filter rule not being applicable to the packet.

18. The computer-readable medium of claim 15, where the one or more instructions, when executed by the one or more processors, further cause the one or more processors to:
- compress the plurality of summary vectors and the segments; and
- store, in association with the plurality of summary vectors, information related to decompressing the segments.

19. The computer-readable medium of claim 15, where the packet information identifies at least one of:
- a source address associated with the packet,
- a destination address associated with the packet,
- a protocol associated with the packet,
- a source network port associated with the packet, or
- a destination network port associated with the packet.

20. The computer-readable medium of claim 15, where the one or more instructions, that cause the one or more processors to apply the filter rule to the packet, cause the one or more processors to:
- cause an action, indicated by the filter rule, to be performed,
  - the action including at least one of:
    - accepting the packet,
    - rejecting the packet,
    - copying the packet,
    - modifying a traffic class associated with the packet,
    - adding, removing, or changing a label associated with the packet,
    - changing a domain associated with the packet, or
    - incrementing a counter associated with the packet.

* * * * *